United States Patent Office 2,914,514
Patented Nov. 24, 1959

2,914,514

COPOLYMERS OF DICHLOROHEXAFLUORO-BUTENE

Elizabeth S. Lo, Elizabeth, N.J., assignor, by mesne assignments, to Minnesota Mining and Manufacturing Company, St. Paul, Minn., a corporation of Delaware No Drawing. Application April 30, 1956
Serial No. 581,328

16 Claims. (Cl. 260—87.5)

This invention relates to, and has for its object, the preparation of new and useful copolymers of dichlorohexafluorobutene. More particularly, the invention relates to, and has for its object, the preparation of thermoplastic copolymers of dichlorohexafluorobutene, having a wide variety of commercial uses and applications. Still more particularly, the invention relates to, and has for its object, a method for the preparation of these copolymers. Other objects and advantages inherent in the invention will become apparent to those skilled in the art from the accompanying description and disclosure.

In accordance with the present invention, dichlorohexafluorobutene is copolymerized with a partially halogenated 1,3-butadiene to produce new and useful copolymeric compositions. In this respect, it is found that the presence of relatively small amounts of the dichlorohexafluorobutene in the copolymeric product of this monomer and the partially halogenated 1,3-butadiene results in a thermoplastic composition of improved resiliency and rubbery characteristics, not otherwise possessed by the butadiene homopolymer itself. In this respect, it is also found that these copolymeric compositions possess increased tensile strength, increased resistance to oil and hydrocarbon fuels, improved flow-properties and improved chemical and physical stability over any of the aforementioned butadiene comonomers alone, when employed in the form of their corresponding homopolymers. These polymeric compositions of dichlorohexafluorobutene and the aforementioned partially halogenated butadienes, constitute valuable macromolecules and are adaptable to a wide variety of commercial uses. They possess low temperature flexibility, in addition to the aforementioned properties of chemical and physical stability and resistance to oil and hydrocarbon fuels. They are also selectively soluble in various commercial solvents and serve as durable, flexible, protective coatings on surfaces which are subjected to environmental conditions in which they may come into contact with any of the aforementioned corrosive substances.

In general, as more fully hereinafter disclosed, the copolymeric compositions of the present invention are produced from the polymers of monomeric mixtures containing dichlorohexafluorobutene (e.g., 4,4-dichlorohexafluorobutene-1 or 2,3-dichlorohexafluorobutene-2) and the partially halogenated 1,3-butadiene as a comonomer such as trifluoro-1,3-butadiene (e.g., 1,1,2-trifluoro-1,3-butadiene or 1,1,3-trifluoro-1,3-butadiene); 1,1-difluoro-2-methyl-1,3-butadiene; fluoroprene (2-fluoro-1,3-butadiene); or chloroprene (2-chloro-1,3-butadiene). The copolymerization reaction is carried out at temperatures between about −20° C. and about 150° C., with intermediate temperature ranges being selected with reference to the specific polymerization system employed. The most useful thermoplastic copolymeric compositions of the present invention are copolymers produced from monomeric mixtures containing between about 20 mole percent and about 60 mole percent of the dichlorohexafluorobutene and the remaining major constituent being any of the aforementioned partially halogenated 1,3-butadienes. The preferred copolymeric compositions of the present invention are copolymers produced from monomeric mixtures containing between about 20 mole percent and about 50 mole percent of the dichlorohexafluorobutene and the remaining major constituent being any of the aforementioned 1,3-butadiene comonomers.

In producing copolymeric compositions from the aforementioned mixtures containing between about 20 mole percent and about 60 mole percent of the dichlorohexafluorobutene and the remaining major constituent being any of the aforementioned partially halogenated 1,3-butadienes, it is found that the finished copolymeric product contains between about 1 mole percent and about 30 mole percent of the dichlorohexafluorobutene and the remaining major constituent being any of the aforementioned butadienes. In producing copolymeric compositions from the aforementioned monomeric mixtures containing between about 20 mole percent and about 50 mole percent of the dichlorohexafluorobutene, it is found that the finished copolymeric product contains between about 1 mole percent and about 10 mole percent of the dichlorohexafluorobutene and the remaining major constituent being any of the aforementioned partially halogenated 1,3-butadienes.

The copolymeric compositions of the present invention are preferably prepared by carrying out the polymerization reaction in the presence of a free radical-forming promoter. For this purpose, the polymerization reaction is carried out by employing a water-soluble peroxy type initiator in a water-suspension type recipe or an organic peroxide initiator in a bulk-type system. The water-suspension type recipe is preferred.

The water-suspension type system contains a water-soluble peroxy-type initiator, which is preferably present in the form of an inorganic persulfate such as potassium persulfate, sodium persulfate or ammonium persulfate. In addition, the water-suspension type recipe system may also contain, in some instances, a variable-valence metal salt, for example, an iron salt such as ferrous sulfate or ferrous nitrate to accelerate the copolymerization reaction. The water-soluble initiator present in the water-suspension type recipe system comprises between about 0.1 and about 5 parts by weight per 100 parts of total monomers present. The variable-valence metal salt is preferably employed in an amount between about 0.01 and about 0.2 parts by weight per 100 parts of total monomers present. It is also desirable, in some instances, in these water-suspension type recipe systems, that a reductant be present, preferably in the form of a bisulfite, such as sodium bisulfite, potassium bisulfite, sodium metabisulfite or potassium metabisulfite. The reductant comprises between about 0.05 and about 5 parts by weight per 100 parts of total monomers present; preferably the reductant comprises between about 0.1 and about 2 parts by weight per 100 parts of total monomers present.

In these water-suspension type recipe systems, it is desirable to employ an emulsifying agent. This emulsifying agent is present either in the form of an aliphatic metal acid-salt having from 14 to 20 carbon atoms per molecule, or in the form of a halogenated-organic acid or salts thereof, having from 6 to 18 carbon atoms per molecule. A typical example of the former is potassium stearate. Typical examples of the halogenated-organic acid or salts thereof, serving as emulsifying agents in the above mentioned water-suspension type recipe systems, are polyfluorocarboxylic acids (e.g., perfluorooctanoic acid) or perfluorochlorocarboxylic acid salts (e.g., trifluorochloroethylene telomer acid soaps). The polyfluorocarboxylic acids which may be employed are such as those disclosed in U.S. Patent No. 2,559,752; and the non-acidic derivatives of the acids disclosed therein as being effective dispersing agents may also be used in the process of the present invention. The perfluorochlorocarboxylic acid salts which may be used in accordance with this invention are those disclosed in copending application Serial No. 501,782, now Patent No. 2,806,867 filed April 18, 1955, as being useful dispersing agents are present in an amount between about 0.5 and about 10 parts by weight per 100 parts of total monomers present.

The polymerization reaction is preferably conducted under alkaline conditions. It is desirable, therefore, that the pH be maintained between about 7 and 11 in order to prevent gelling of the resulting polymeric product, a condition which often causes slow-down or stoppage of the polymerization reaction. In this respect, it should be noted that it is sometimes necessary to maintain the pH of the system within the aforementioned pH limits by the addition of suitable buffer agents. Typical examples are sodium borate and disodium phosphate.

As indicated above, the polymerization reaction may also be carried out with the initiator being present in the form of an organic peroxide in a bulk-type polymerization system. Of these organic peroxide promoters, halogen-sustituted peroxides are most desirable. A preferred promoter of this type is trichloroacetyl peroxide. Other halogen-substituted organic peroxides for carrying out the polymerization reaction are trifluorodichloropropionyl peroxide, trifluoroacetyl peroxide, difluoroacetyl peroxide, chloracetyl peroxide, 2,4-dichlorobenzoyl peroxide and dichlorofluoroacetyl peroxide.

As previously indicated, the polymerization reaction is carried out, in general, at a temperature between about —20° C. and about 150° C. When the polymerization reaction is carried out employing a water-suspension type recipe, temperatures between about 5° C. and about 100° C. are preferably employed. When the polymerization reaction is carried out in the presence of an organic peroxide initiator in a bulk-type polymerization system, temperatures over the entire range of between about —20° C. and about 150° C. are preferably employed depending upon the decomposition temperature of the promoter. The polymerization reactions described herein to produce the polymeric compositions of the present invention are carried out under autogenous conditions of pressure. These pressures may vary from about atmospheric pressure to as high as 2000 pounds per square inch. However, in general, these pressures do not rise above approximately 500 pounds per square inch.

As previously indicated, the polymeric compositions of the present invention are particularly suitable and useful when employed in the form of durable, flexible coatings on a wide variety of surfaces, and particularly on surfaces which are subjected to distortion in normal uses, such as fabric surfaces. For this purpose, the polymeric composition may be dissolved in various commercial solvents. Particularly useful solvents comprise the aliphatic and aromatic esters, ketones and halogenated hydrocarbons. Typical examples of these solvents are di-isobutyl ketone, methyl ethyl ketone, methyl isobutyl ketone, ethyl acetate and 1,1,2-trifluorotrichloroethane. In this respect, it should be noted that it is often desirable to regulate the molecular weight of the polymeric compositions of the present invention in order to obtain greater solubility in organic solvents. It is found that the addition of various polymerization modifiers appreciably reduces the molecular weight of the polymeric compositions and increases their solubility, without affecting, unduly, the overall yield. Suitable polymerization modifiers include chloroform (CHCl$_3$), Freon–113 (CF$_2$ClCFCl$_2$), carbon tetrachloride (CCl$_4$), trichloroacetyl chloride (CCl$_3$COCl), bromotrichloromethane (CBrCl$_3$), dodecyl mercaptan (C$_{12}$H$_{25}$SH) and mixed tertiary mercaptans. These modifiers are preferably added in amounts between about 0.01 and about 10 parts by weight per 10 parts of total monomers charged to the polymerization reaction. Chloroform is preferred.

The following examples are offered for a better understanding in producing the thermoplastic copolymeric compositions of the present invention and are not to be construed as limiting its scope.

*Example I*

A heavy-walled glass polymerization tube of about 20 ml. capacity was flushed with nitrogen and then charged with 1 ml. of a solution prepared by dissolving 0.4 grams of sodium metabisulfite in 20 ml. of water. The contents of the tube were then frozen. The tube was next connected to a gas-transfer system and evacuated at liquid nitrogen temperature. Therefore, there was added to the tube 4 ml. of a solution prepared by dissolving 1.0 gram of potassium persulfate in 80 ml. of water. Thereafter, there was added to the tube 5 ml. of a solution prepared by dissolving 5 grams of potassium stearate in 100 ml. of water, this solution having previously been adjusted to a pH of 10. The contents of the tube were then refrozen, and the tube was next connected to a gas-transfer system and evacuated at liquid nitrogen temperature. To the frozen contents of the tube were added, by distillation, 2.4 grams of 4,4-dichlorohexafluorobutene-1 and 2.6 grams of 1,1,2-trifluoro-1,3-butadiene, which comprised a 30/70 molar ratio.

The 4,4-dichlorohexafluorobutene-1 monomer is prepared as follows:

Trifluorochloroethylene is telomerized in the presence of sulfuryl chloride, employing benzoyl peroxide as a promoter, at a temperature of approximately 95° C. for a period of 4 hours, to produce the telomer dimer product, Cl-(CF$_2$—CFCl)$_2$-Cl, 1,2,4,4-tetrachlorohexafluorobutane, having a boiling point of 134° C. and an index of refraction ($n_D^{20}$) of 1.3820. To a 1 L. round-bottom flask equipped with a magnetic stirrer, a dropping funnel, and a Friedrich condenser (which, in turn, is attached to a bubbler and cold trap maintained at a temperature of —68° C.) there is charged 357 grams (1.17 mol) of the aforementioned 1,2,4,4-tetrachlorohexafluorobutane. The contents of the flask are then heated to 130° C. Thereafter, 105.5 grams (0.63 mol) of triethyl phosphite are added dropwise over a period of 3 hours. The heating is continued for an additional period of 1 hour, after which time the generation of gas has ceased. The cold trap is found to contain only liquefied ethyl chloride (25.6 grams).

The 1,1,2-trifluoro-1,3-butadiene monomer was obtained by adding dibromofluoromethane to 1-fluoropropene to produce the adduct CF$_2$BrCHFCHBrCH$_3$, which, upon dehydrobromination, yielded CF$_2$=CFCHCH$_2$ B.P. 4.8° C.-8.0° C. 1-fluoropropene was prepared by the following series of reactions:

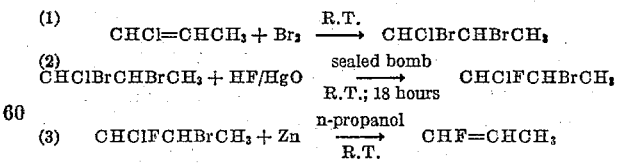

The polymerization tube, following the addition of the aforementioned monomers, was next sealed under vacuum and agitated in a temperature-regulated water-bath at 50° C. for a period of 24 hours. At the end of this time, the contents of the tube were coagulated by freezing at liquid nitrogen temperature. The coagulated product was then removed from the tube, washed with hot water and then dried to constant weight in vacuo at 35° C. A rubbery copolymer product was obtained which was found, upon analysis, to comprise 2.5 mole percent 4,4-dichlorohexafluorobutene-1, and the remaining major constituent, 1,1,2-trifluoro-1,3-butadiene, being present in an amount of 97.5 mole percent. The copolymer was obtained in an amount corresponding to a 43% conversion.

Example II

Employing the procedure set forth in Example I and the same polymerization system, the tube was charged with 1.76 grams of 2,3-dichlorohexafluorobutene-2 and 3.24 grams of 1,1,2-trifluoro-1,3-butadiene, which comprised a 20/80 molar ratio.

The 2,3-dichlorohexafluorobutene-2 is prepared according to the procedure disclosed by Henne and Trott, Journal of the American Chemical Society, volume 69, page 1820 (1947).

The polymerization reaction was carried out at a temperature of 50° C. for a period of 23 hours. The resultant rubbery product was worked-up in accordance with the same procedure as set forth in Example I. This rubbery copolymeric product was found, upon analysis, to comprise approximately 29.5 mole percent 2,3-dichlorohexafluorobutene-2, and the remaining major constituent, 1,1,2-trifluoro-1,3-butadiene, being present in an amount of approximately 70.5 mole percent. The copolymer was obtained in an amount corresponding to a 36% conversion.

Example III

Employing the procedure set forth in Example I and the same polymerization system, the tube was charged with 2.4 grams of 4,4-dichlorohexafluorobutene-1 and 2.6 grams of 1,1,3-trifluoro-1,3-butadiene, which comprised a 30/70 molar ratio.

The 1,1,3-trifluoro-1,3-butadiene monomer was obtained by adding dibromodifluoromethane to a 2-fluoropropene to produce the adduct, $CF_2BrCH_2CFBrCH_3$, which was then dehydrobrominated at about 150° C. using tri-n-butyl amine to yield $CF_2=CH-CF=CH_2$, B.P. 17.5° C.–19.4° C. 2-fluoropropene was prepared by the following series of reactions:

(1) $CH_2ClCHClCH_3 + KOH \longrightarrow CH_2=CClCH_3 + CHCl=CHCH_3$ (2) $CH_2=CClCH_3 + HF \longrightarrow CH_3CFClCH_3$ (3) $CH_3CFClCH_3 \xrightarrow[\text{ethanol}]{\text{KOH: 95 percent}} CH_2=CF-CH_3$ The polymerization reaction was carried out at a temperature of 50° C. for a period of 24 hours. The resultant rubbery copolymeric product was worked-up in accordance with the same procedure as set forth in Example I. This rubbery product, upon analysis, was found to comprise approximately 2 mole percent 4,4-dichlorohexafluorobutene-1, and the remaining major constituent, 1,1,3-trifluoro-1,3-butadiene, being present in an amount of approximately 98 mole percent. The copolymer was obtained in an amount corresponding to a 27% conversion.

Example IV

Employing the procedure set forth in Example I, the same catalyst system was employed, except that the potassium stearate solution was replaced with 5 ml. of a solution prepared by dissolving 1 gram of the potassium salt of octanoic acid in 100 ml. of water, previously adjusted to a pH of 11. The polymerization tube was next charged with 3.44 grams of 4,4-dichlorohexafluorobutene-1 and 1.56 grams of 1,1,3-trifluoro-1,3-butadiene, which comprised a 50/50 molar ratio.

The polymerization reaction was carried out at a temperature of 50° C. for a period of 16 hours. The resultant rubbery copolymeric product was worked-up in accordance with the same procedure as set forth in Example I. This rubbery product, upon analysis, was found to comprise approximately 2 mole percent 4,4-dichlorohexafluorobutene-1, and the remaining major constituent, 1,1,3-trifluoro-1,3-butadiene, being present in an amount of approximately 98 mole percent. The copolymer was obtained in an amount corresponding to a 12% conversion. The copolymeric material was next cold-milled at 25° C. for a period of 10 minutes. A uniform rubbery sheet was obtained.

Example V

Employing the procedure set forth in Example IV and the same polymerization system, the tube was charged with 2.44 grams of 4,4-dichlorohexafluorobutene-1 and 2.56 grams of 1,1-difluoro-2-methyl-1,3-butadiene, which comprised a 30/70 molar ratio. The 1,1-difluoro-2-methyl-1,3-butadiene is prepared as follows:

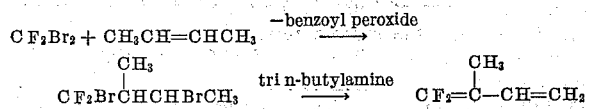

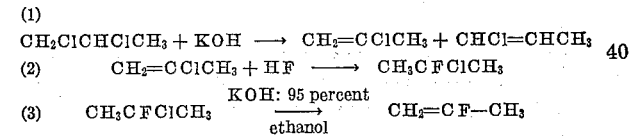

The polymerization reaction was carried out at a temperature of 50° C. for a period of 16 hours. The resultant rubbery copolymeric product was worked-up in accordance with the same procedure as set forth in Example I. This rubbery product, upon analysis, was found to comprise approximately 2.5 mole percent 4,4-dichlorohexafluorobutene-1, and the remaining major constituent, 1,1-difluoro-2-methyl-1,3-butadiene, being present in an amount of approximately 97.5 mole percent. The copolymer was obtained in an amount corresponding to a 15% conversion. The raw rubbery copolymeric product was cold-milled at a temperature of about 25° C. for a period of 10 minutes. The uniform rubbery sheet was obtained.

Example VI

A heavy-walled glass polymerization tube of about 20 ml. capacity was flushed with nitrogen and then charged with 5 ml. of a solution prepared by dissolving 1 gram of potassium persulfate in 100 ml. of water. The contents of the tube were then frozen, and the tube was next connected to a gas-transfer system and evacuated at liquid nitrogen temperature. To the frozen contents of the tube were next added 5 ml. of a solution prepared by dissolving 0.75 grams of the $C_8$-teleomer acid

$CF_2Cl(CFClCF_2)_3COOH$ and dissolved in 100 ml. of water, and the solution adjusted with potassium hydroxide to a pH of 7. The contents of the tube were then frozen. The tube was then connected to a gas-transfer system and evacuated at liquid nitrogen temperature. To the frozen contents of the tube were added, by distillation, 1.76 grams of 2,3-dichlorohexafluorobutene-2 and 3.24 grams of 1,1,3-trifluoro-1,3-butadiene, which comprised a 20/80 molar ratio.

The polymerization tube was next sealed under vacuum and agitated in a temperature-regulated water-bath at 50° C. for a period of 23 hours. At the end of this time, the contents of the tube were coagulated by freezing at liquid nitrogen temperature. The coagulated product was then removed from the tube, washed with hot water and then dried to constant weight in vacuo at 35° C. A copolymeric rubbery product was obtained which was found, upon analysis, to comprise 1 mole percent of 2,3-dichlorohexafluorobutene-2, and the remaining major constituent, 1,1,3-trifluoro-1,3-butadiene, being present in an amount of approximately 99 mole percent. The copolymer was obtained in an amount corresponding to a 9% conversion.

Example VII

Employing the procedure set forth in Example I and the same polymerization system, the tube was charged with 2.24 grams of 2,3-dichlorohexafluorobutene-2 and 2.76 grams of fluoroprene (2-fluoro-1,3-butadiene), which comprised a 20/80 molar ratio.

The polymerization reaction was carried out at a temperature of 50° C. for a period of 24 hours. The resultant rubbery product was worked-up in accordance with the same procedure as set forth in Example I. This thermoplastic product was found, upon analysis, to comprise approximately 2.5 mole percent of 2,3-dichlorohexafluorobutene-2, and the remaining major constituent, fluoroprene, being present in an amount of approximately 97.5 mole percent. The copolymer was obtained in an amount corresponding to a 33% conversion.

A sample of the raw copolymer was cold-milled at 25° C. for a period of 10 minutes to produce a rubbery sheeted material. This material was compression molded at a temperature of 250° F. for a period of 10 minutes. After molding, the sample retained its rubbery characteristics. A volume increase of 49% was observed in the molded sample when tested by ASTM Designation, D-470-49 T, in ASTM Type II Fuel, consisting of iso-octane (60% by volume), benzene (5% by volume), toluene (20% by volume) and xylene (15% by volume). The Gehman Stiffness of the molded sample of the raw copolymer determined according to ASTM Designation, D-1053-49 T, was as follows:

$T_2 = +4.4°$ C.; $T_5 = -9.1°$ C.
$T_{10} = -14.7°$ C.; $T_{100} = -29.5°$ C.

As previously indicated, the polymeric compositions of the present invention possess highly desirable physical and chemical properties which make them useful for fabrication of a wide variety of thermoplastic articles, or for the application to various surfaces as protective coatings. In such uses, a raw elastomeric copolymer, such as is produced in accordance with the procedure set forth in the above examples, is extruded or pressed into sheets at temperatures between about 250° F. and about 400° F. and at a pressure between about 500 and about 15,000 pounds per square inch for a period of about 5 to about 60 minutes. Thereafter, various articles can be molded from preforms cut from sheets and extruded stock in the form of gaskets, diaphragms, packings, etc. In this respect, it is preferred in such applications, that the raw copolymer also includes various vulcanizing agents and fillers.

When employed as protective coatings on any of the surfaces previously described, the raw copolymeric composition is dissolved in any of the aforementioned solvents and is applied to the desired surfaces, employing such apparatus as a knife-spreader or a doctor-blade or a reverse-roll coater. The solvent, after the copolymeric coating composition has been applied to the surface, is permitted to evaporate. This may also be accomplished in the presence of elevated temperatures, if so desired. In many applications, it is desirable to include in the copolymeric coating composition, various vulcanizing agents. In the latter case, supplementary heat-treatment of the coating is required, either during the solvent-removal step or thereafter. After the solvent has been completely evaporated, the coated surface is ready for use. In this respect, it should be noted that the polymeric coating or, if so desired, the protective coating may be built-up by the application of several layers, each layer being permitted to harden by solvent evaporation before the next layer is applied. Furthermore, if so desired, the protective coatings, or the polymeric composition, when obtained in the form of sheets, may be suitably pigmented. Other uses for the polymeric compositions of the present invention reside in the fabrication of belting, hose, mountings, piston and pump-valves, sheet or valve disks, rolls, tubing, pressure-sensitive tape for electrical insulation purposes, grommets, or as adhesives for fastening a rubber surface to a metal or another rubber surface.

Since certain changes may be made in carrying out the process of the present invention in producing the desired polymeric compositions without departing from the scope of the invention, it is intended that all matter contained in the above description is to be interpreted as illustrative and not in a limiting sense.

I claim:
1. A process which comprises polymerizing a monomeric mixture of a dichlorohexafluorobutene selected from the group consisting of 2,3-dichlorohexafluorobutene-2 and 4,4-dichlorohexafluorobutene-1 and a partially halogenated 1,3-butadiene selected from the group consisting of trifluorobutadiene, 1,1-difluoro-2-methyl-1,3-butadiene, fluoroprene and chloroprene, said mixture containing between about 20 mole percent and about 60 mole percent dichlorohexafluorobutene and the remaining major constituent being the partially halogenated 1,3-butadiene, at a temperature between about −20° C. and about 100° C. in the presence of a polymerization promoter selected from the group consisting of a water soluble peroxy promoter and an organic peroxy promoter.

2. A process which comprises polymerizing a monomeric mixture of a dichlorohexafluorobutene selected from the group consisting of 2,3-dichlorohexafluorobutene-2 and 4,4-dichlorohexafluorobutene-1 and a partially halogenated 1,3-butadiene selected from the group consisting of trifluorobutadiene, 1,1-diffuoro-2-methyl-1,3-butadiene, fluoroprene and chloroprene, said mixture containing between about 20 mole percent and about 50 mole percent dichlorohexafluorobutene and the remaining major constituent being the partially halogenated 1,3-butadiene, at a temperature between about −20° C. and about 100° C. in the presence of a polymerization promoter selected from the group consisting of a water soluble peroxy promoter and an organic peroxy promoter.

3. A process which comprises polymerizing a monomeric mixture of a dichlorohexafluorobutene selected from the group consisting of 2,3-dichlorohexafluorobutene-2 and 4,4-dichlorohexafluorobutene-1 and trifluorobutadiene, said mixture containing between about 20 mole percent and about 60 mole percent dichlorohexafluorobutene and the remaining major constituent being trifluoro-1,3-butadiene, at a temperature between about −20° C. and about 100° C. in the presence of a polymerization promoter selected from the group consisting of a water soluble peroxy promoter and an organic peroxy promoter.

4. A process which comprises polymerizing a monomeric mixture of a dichlorohexafluorobutene selected from the group consisting of 2,3-dichlorohexafluorobutene-2 and 4,4-dichlorohexafluorobutene-1 and 1,1-difluoro-2-methyl-1,3-butadiene, said mixture containing between about 20 mole percent and about 60 mole percent dichlorohexafluorobutene and the remaining major constituent being 1,1-difluoro-2-methyl-1,3-butadiene, at a temperature between about −20° C. and about 100° C. in the presence of a polymerization promoter selected from the group consisting of a water soluble peroxy promoter and an organic peroxy promoter.

5. A process which comprises polymerizing a monomeric mixture of a dichlorohexafluorobutene selected from the group consisting of 2,3-dichlorohexafluorobutene-2 and 4,4-dichlorohexafluorobutene-1 and fluoroprene, said mixture containing between about 20 mole percent and about 60 mole percent dichlorohexafluorobutene and the remaining major constituent being fluoroprene, at a temperature between about −20° C. and about 100° C. in the presence of a polymerization promoter selected from the group consisting of a water soluble peroxy promoter and an organic peroxy promoter.

6. A process which comprises polymerizing a monomeric mixture of a dichlorohexafluorobutene selected from the group consisting of 2,3-dichlorohexafluorobutene-2 and 4,4-diclorohexafluorobutene-1 and a chloroprene, said mixture containing between about 20 mole percent and about 60 mole percent dichlorohexafluorobutene and the remaining major constituent being chloroprene, at a temperature between about −20° C. and about 100° C. in the presence of a polymerization promoter selected from the group consisting of a water soluble peroxy promoter and an organic peroxy promoter.

7. A copolymer of about 1 mole percent to about 30 mole percent of a dichlorohexafluorobutene selected from the group consisting of 2,3-dichlorohexafluorobutene-2 and 4,4-dichlorohexafluorobutene-1 and correspondingly about 99 mole percent and about 70 mole percent of a partially halogenated 1,3-butadiene selected from the group consisting of trifluorobutadiene, 1,1-difluoro-2-methyl-1,3-butadiene, fluoroprene and chloroprene.

8. A copolymer of about 1 mole percent to about 30 mole percent of a dichlorohexafluorobutene selected from the group consisting of 2,3-dichlorohexafluorobutene-2 and 4,4-dichlorohexafluorobutene-1 and correspondingly about 99 mole percent to about 70 mole percent of trifluorobutadiene.

9. A copolymer of about 1 mole percent to about 30 mole percent of a dichlorohexafluorobutene selected from the group consisting of 2,3-dichlorohexafluorobutene-2 and 4,4-dichlorohexafluorobutene-1 and correspondingly about 99 mole percent to about 70 mole percent of 1,1-difluoro-2-methyl-1,3-butadiene.

10. A copolymer of about 1 mole percent to about 30 mole percent of a dichlorohexafluorobutene selected from the group consisting of 2,3-dichlorohexafluorobutene-2 and 4,4-dichlorohexafluorobutene-1 and correspondingly about 99 mole percent to about 70 mole percent of fluoroprene.

11. A copolymer of about 1 mole percent to about 30 mole percent of a dichlorohexafluorobutene selected from the group consisting of 2,3-dichlorohexafluorobutene-2 and 4,4-dichlorohexafluorobutene-1 and correspondingly about 99 mole percent to about 70 mole percent of chloroprene.

12. A process which comprises polymerizing a monomeric mixture of 2,3-dichlorohexafluorobutene-2 and a partially halogenated 1,3-butadiene selected from the group consisting of trifluorobutadiene, 1,1-difluoro-2-methyl-1,3-butadiene, fluoroprene and chloroprene, said mixture containing between about 20 mole percent and about 60 mole percent 2,3-dichlorohexafluorobutene-2 and the remaining major constituent being said partially halogenated 1,3-butadiene, at a temperature between about —20° C. and about 100° C. in the presence of a polymerization promoter selected from the group consisting of a water soluble peroxy promoter and an organic peroxy promoter.

13. A process which comprises polymerizing a monomeric mixture of 4,4-dichlorohexafluorobutene-1 and a partially halogenated 1,3-butadiene selected from the group consisting of trifluorobutadiene, 1,1-difluoro-2-methyl-1,3-butadiene, fluoroprene and chloroprene, said mixture containing between about 20 mole percent and about 60 mole percent 4,4-dichlorohexafluorobutene-1 and the remaining major constituent being said partially halogenated 1,3-butadiene, at a temperature between about —20° C. and about 100° C. in the presence of a polymerization promoter selected from the group consisting of a water soluble peroxy promoter and an organic peroxy promoter.

14. A copolymer of about 1 mole percent to about 30 mole percent of 2,3-dichlorohexafluorobutene-2 and correspondingly about 99 mole percent to about 70 mole percent of trifluoro-1,3-butadiene.

15. A copolymer of about 1 mole percent to about 30 mole percent of 4,4-dichlorohexafluorobutene-1 and correspondingly about 99 mole percent to about 70 mole percent of trifluoro-1,3-butadiene.

16. A process which comprises polymerizing in an emulsion system a monomeric mixture of a dichlorohexafluorobutene selected from the group consisting of 2,3-dichlorohexafluorobutene-2 and 4,4-dichlorohexafluorobutene-1, and a partially halogenated 1,3-butadiene selected from the group consisting of trifluorobutadiene, 1,1-difluoro-2-methyl-1,3-butadiene, fluoroprene and chloroprene, said mixture containing between about 20 mole percent and about 60 mole percent dichlorohexafluorobutene and the remaining major constituent being the partially halogenated 1,3 butadiene, at a temperature between about 5° C. and about 100° C. and a pH of between about 7 and 11 in the presence of a polymerization promoter selected from the group consisting of a water soluble peroxy promoter and an organic peroxy promoter.

References Cited in the file of this patent

UNITED STATES PATENTS 2,705,706   Dittman et al. _____ Apr. 5, 1955

FOREIGN PATENTS 478,511   Canada _____ Nov. 13, 1951
494,441   Canada _____ July 14, 1953

UNITED STATES PATENT OFFICE
CERTIFICATE OF CORRECTION

Patent No. 2,914,514            November 24, 1959

Elizabeth S. Lo

It is hereby certified that error appears in the above numbered patent requiring correction and that the said Letters Patent should read as corrected below.

Column 4, line 2, for "10 parts" read -- 100 parts --; column 7, line 14, for "D-470-49T" read -- D-471-49T --.

Signed and sealed this 12th day of July 1960.

(SEAL)

Attest:
KARL H. AXLINE
Attesting Officer

ROBERT C. WATSON
Commissioner of Patents